(12) United States Patent
Nozawa

(10) Patent No.: US 9,073,305 B2
(45) Date of Patent: Jul. 7, 2015

(54) RECORDING METHOD

(71) Applicant: Seiko Epson Corporation, Tokyo (JP)

(72) Inventor: Atsushi Nozawa, Matsumoto (JP)

(73) Assignee: Seiko Epson Corporation (JP)

( * ) Notice: Subject to any disclaimer, the term of this patent is extended or adjusted under 35 U.S.C. 154(b) by 167 days.

(21) Appl. No.: 13/851,579

(22) Filed: Mar. 27, 2013

(65) Prior Publication Data

US 2014/0192120 A1    Jul. 10, 2014

(30) Foreign Application Priority Data

Jan. 7, 2013  (JP) .................. 2013-000708

(51) Int. Cl.
*B41J 2/01*  (2006.01)
*B41M 5/50*  (2006.01)
*B41M 5/52*  (2006.01)

(52) U.S. Cl.
CPC ............... *B41J 2/01* (2013.01); *B41M 5/5218* (2013.01); *B41M 5/502* (2013.01); *B41M 5/52* (2013.01)

(58) Field of Classification Search
CPC ........... B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 5/502; B41M 5/52; B41M 5/5218
USPC ............ 347/105, 101, 100, 96, 95, 102, 103; 523/160, 161; 428/195, 32.1
See application file for complete search history.

(56) References Cited

U.S. PATENT DOCUMENTS

| | | | | |
|---|---|---|---|---|
| 4,944,988 A * | 7/1990 | Yasuda et al. | ................. | 347/105 |
| 6,114,022 A * | 9/2000 | Warner et al. | ................. | 347/105 |
| 6,156,384 A * | 12/2000 | Hutter et al. | .................. | 427/288 |
| 7,354,634 B2 * | 4/2008 | Takehiko et al. | ........... | 428/32.31 |
| 2003/0203134 A1 | 10/2003 | Sheng | .......................... | 428/32.1 |
| 2009/0022910 A1 * | 1/2009 | Teramae | ...................... | 428/32.2 |
| 2011/0234728 A1 * | 9/2011 | Aoki et al. | .................... | 347/102 |
| 2011/0279554 A1 * | 11/2011 | Dannhauser et al. | ......... | 347/106 |

FOREIGN PATENT DOCUMENTS

JP    2011-202089    10/2011

* cited by examiner

*Primary Examiner* — Manish S Shah

(74) *Attorney, Agent, or Firm* — Harness, Dickey & Pierce, P.L.C.

(57) ABSTRACT

Provided is a recording method of discharging ink including resin and a solvent to a heated recording medium to record an image on the recording medium by an ink jet recording apparatus, in which an absorption amount of the ink per unit mass of the recording medium is equal to or less than 1.0, and a wetting index of the recording medium measured based on JIS K6768 is equal to or more than 46, and when the wetting index is set as x, and the absorption amount of the ink per unit mass of the recording medium is set as y, a relationship of y≥0.002x−0.027 is satisfied.

7 Claims, 5 Drawing Sheets

RECORDING METHOD

BACKGROUND

1. Technical Field

The present invention relates to an ink jet recording method.

2. Related Art

A technology of discharge ink including resin and a solvent onto a recording medium to record an image (information) by an ink jet recording apparatus has been known (for example, see JP-A-2012-186315).

In a recording medium of the related art, resin-containing ink has poor evaporation efficiency of an ink solvent, and image quality is easily degraded (aggregation or overflow). Accordingly, in order to obtain a sufficient chromogenic property, it was necessary to have a small discharging amount of ink per unit time to provide sufficient time for drying the ink solvent, and thus, rapidly recording of an image was difficult.

In addition, since it was difficult for the ink to be spread onto the recording medium, a landing diameter was small, and the efficiency of the chromogenic property of the discharging ink per 1 dot was poor. Accordingly, if the discharging amount of the ink is set to be small per unit area to improve a recording speed, regions with no ink are formed between dots of the landed ink, and thus, the chromogenic property of an image is degraded.

SUMMARY

An advantage of some aspects of the invention is to provide a recording method capable of rapid printing using ink including resin and a solvent, and recording a high-quality image with an excellent chromogenic property.

The advantage is achieved by the invention described below.

According to an aspect of the invention, there is provided a recording method of discharging ink including resin and a solvent to a heated recording medium to record an image on the recording medium by an ink jet recording apparatus, in which an absorption amount of the ink per unit mass of the recording medium is equal to or less than 1.0, and a wetting index of the recording medium measured based on JIS K6768 is equal to or more than 46, and when the wetting index is set as x, and the absorption amount of the ink per unit mass of the recording medium is set as y, a relationship of $y \geq 0.002x - 0.027$ is satisfied.

Accordingly, it is possible to provide a recording method capable of rapid printing using ink including resin and a solvent, and recording a high-quality image with an excellent chromogenic property. In addition, it is possible to further reliably suppress image quality degradation (aggregation or overflow) in the rapid recording and to further improve a chromogenic property of an image.

In the recording method of the invention, it is preferable that a relationship of $y \geq 5 \times 10^{17} \times x^{-10.796}$ be satisfied, when the wetting index of the recording medium measured based on JIS K6768 is set as x, and the absorption amount of the ink per unit mass of the recording medium is set as y.

Accordingly, even in a case where mass per droplet of the ink to be discharged is large and the image quality degradation (aggregation or overflow) easily occurs, it is possible to further reliably suppress image quality degradation (aggregation or overflow) in the rapid recording and to further improve a chromogenic property of an image.

In the recording method of the invention, a relationship of $y \leq -0.00552x + 3.2429$ is satisfied, when the wetting index of the recording medium measured based on JIS K6768 is set as x, and the absorption amount of the ink per unit mass of the recording medium is set as y.

Accordingly, even in a case where mass per droplet of the ink to be discharged is small and regions with no ink are further easily formed between dots of landed ink, it is possible to improve a chromogenic property of an image and to further increase a recording speed.

In the recording method of the invention, it is preferable that the recording medium include an ink accommodation layer, and the ink accommodation layer include at least one kind of a material selected from a group consisting of urethane, acryl, and polyester, and/or at least two kinds of copolymer selected from a group consisting of urethane, acryl, and polyester.

Accordingly, it is possible to further easily control an absorption amount of the ink per unit mass and a wetting index.

In the recording method of the invention, it is preferable that the resin included in the ink be thermoplastic resin.

Accordingly, when discharging ink to the heated recording medium, by softening thermoplastic resin, it is possible to further easily form a film of the thermoplastic resin on the recording medium. As a result, it is possible to further improve a chromogenic property of an image.

In the recording method of the invention, it is preferable that the solvent included in the ink be at least one selected from a group consisting of 2-pyrrolidone, 1,2-hexanediol, dipropylene glycol, and propylene glycol.

Accordingly, it is possible to further efficiently soften the resin on a recording medium, and to further easily form a film. As a result, it is possible to further improve a chromogenic property of an image.

In the recording method of the invention, it is preferable that a discharging amount of the ink with respect to the recording medium be equal to or more than 14 ng and equal to or less than 23 ng, and resolution of the image recorded on the recording medium be equal to or more than 720×720 dpi.

Accordingly, it is possible to improve a chromogenic property and to form an image with high resolution.

In the recording method of the invention, it is preferable that a surface temperature of the recording medium in a heated state be equal to or more than 40° C. and equal to or less than 60° C.

Accordingly, it is possible to further efficiently dry ink discharged onto a surface of a recording medium. In addition, it is possible to further easily form a film of resin included in ink on a recording medium.

BRIEF DESCRIPTION OF THE DRAWING

The invention will be described with reference to the accompanying drawing, wherein like numbers reference like elements.

DESCRIPTION OF EXEMPLARY EMBODIMENTS

Figure 1:
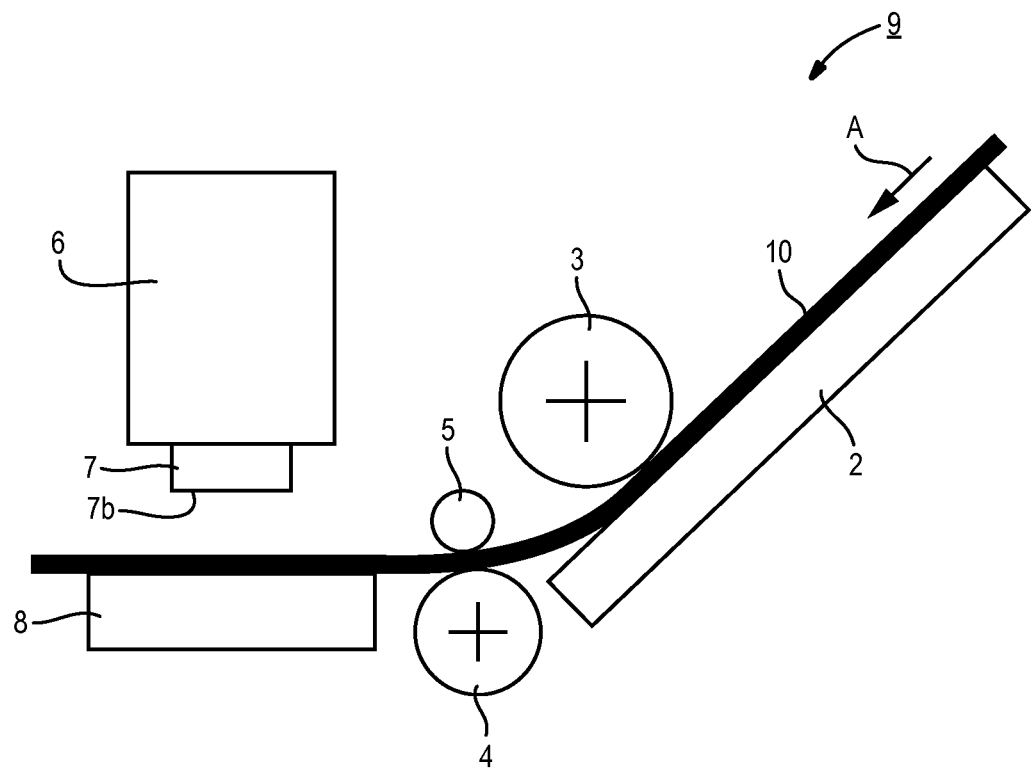
FIG. 1 is a partial cross-sectional view schematically showing a part of an ink jet recording apparatus.
Figure 2:
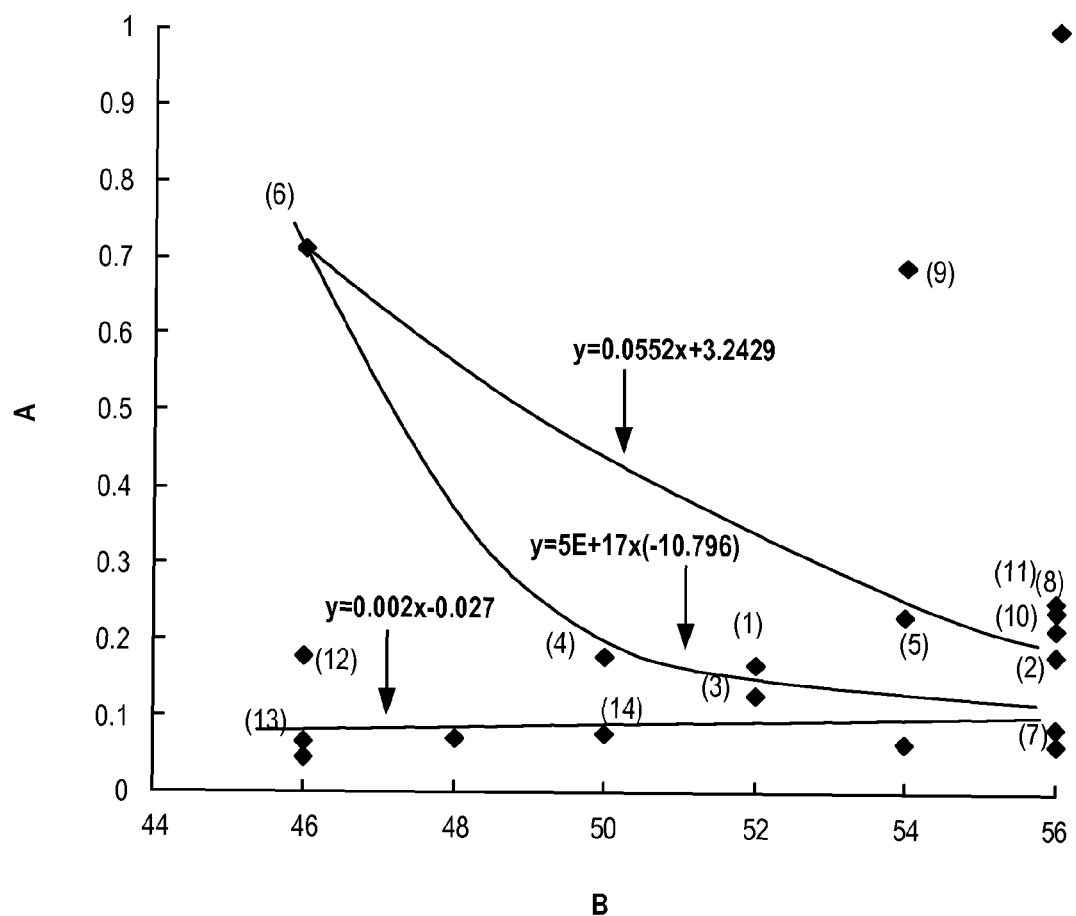
FIG. 2 shows a wetting index of the recording medium measured based on JIS K6768(B) dependency of an absorption amount of the ink per unit mass of the recording medium (A).
Figure 3:
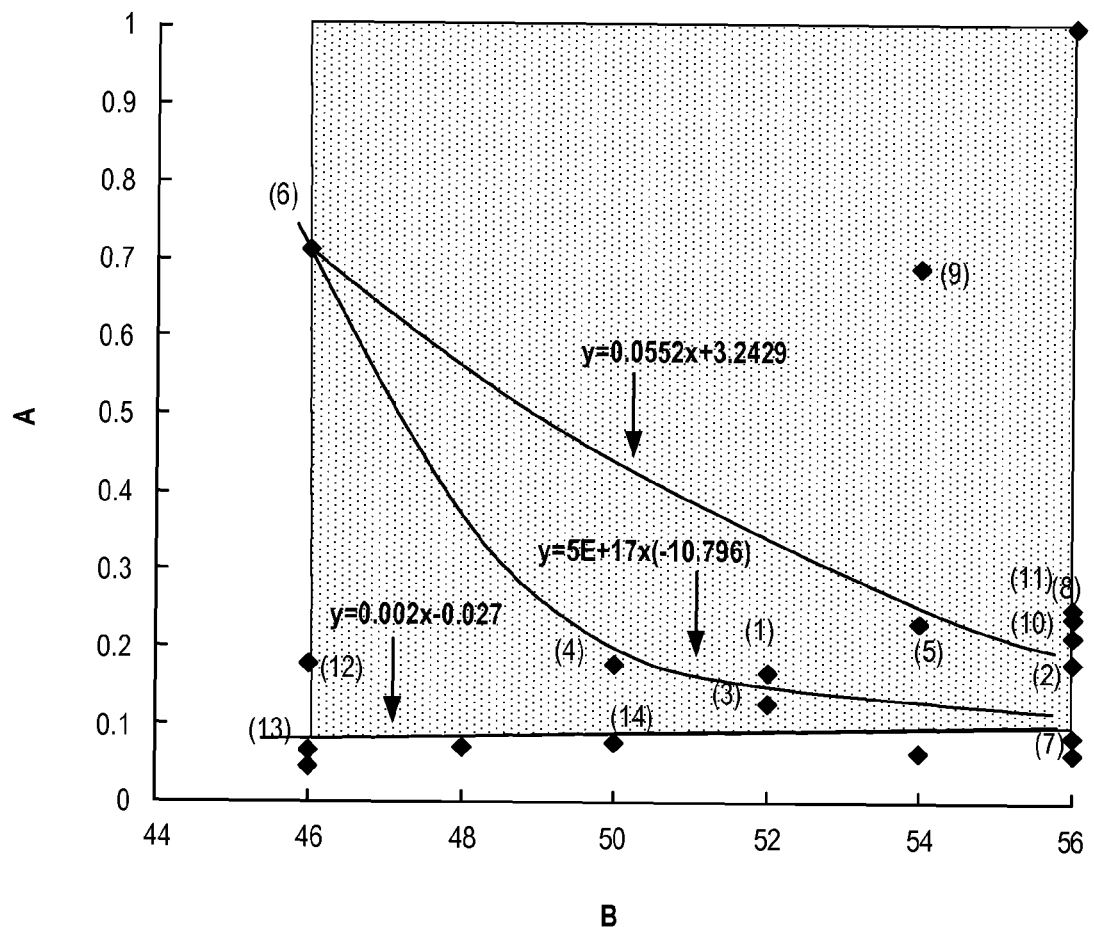
FIGS. 3, 4 and 5 show a range of inventions.
Figure 4:
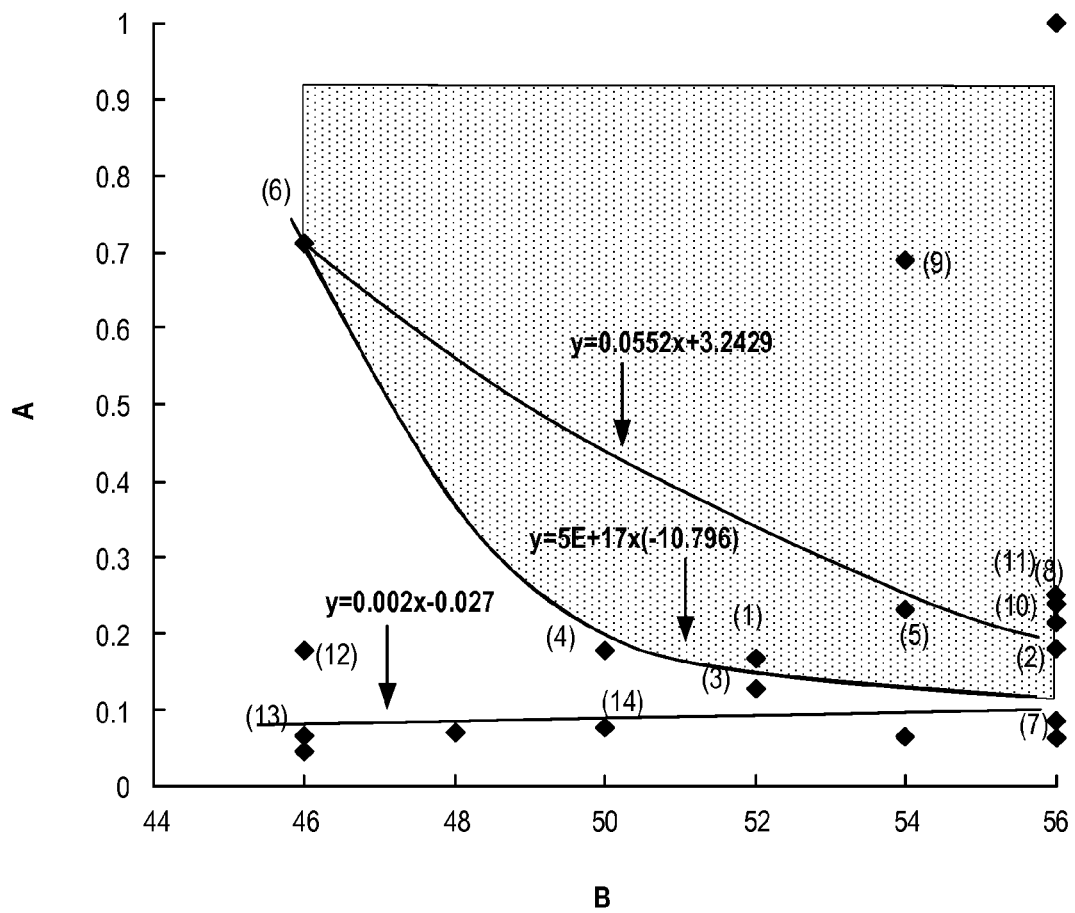
Figure 5:
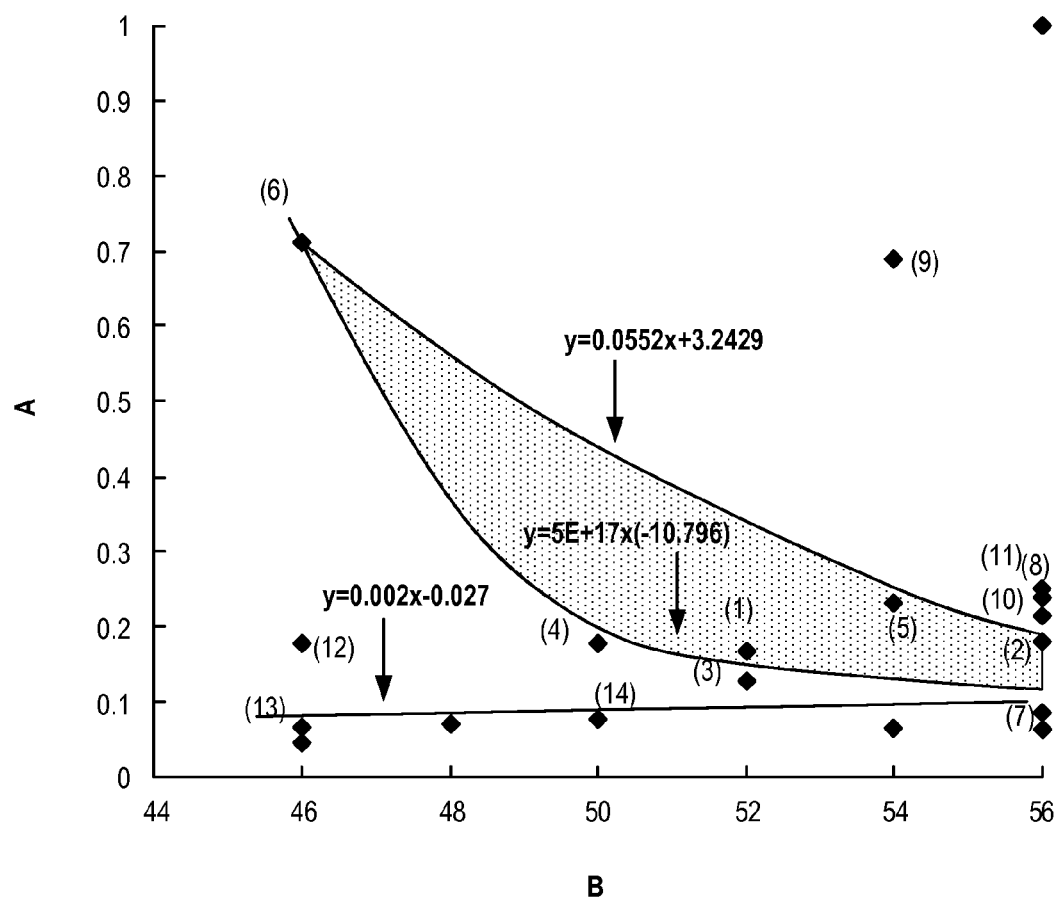

Hereinafter preferable embodiments of the invention will be described in detail.

Recording Method

First, a recording method of the invention will be described.

The recording method of the invention is a recording method of discharging ink including resin and a solvent (hereinafter, also simply referred to as resin-containing ink) in a heated recording medium to record an image on the recording medium by an ink jet recording apparatus.

However, in a recording medium of the related art, evaporation efficiency of an ink solvent of the resin-containing ink was poor and image quality degradation (aggregation or overflow) easily occurred. Accordingly, in order to obtain a sufficient chromogenic property, it was necessary to have a small discharging amount of ink per unit time to provide time for sufficiently drying the ink solvent, and thus, it was difficult to rapidly record an image.

In addition, since it was difficult for the ink to be spread onto the recording medium, a landing diameter was small, and the efficiency of the chromogenic property of the discharging ink per 1 dot was poor. Accordingly, if the discharging amount of the ink is set to be small per unit area to improve a recording speed, regions with no ink are formed between dots of the landed ink, and thus, the chromogenic property of an image is degraded.

Here, the inventor has found that it is possible to obtain sufficient coloring and to further increase a recording speed, even in a case of a large discharging amount of the ink per unit time, by using a recording medium in which an absorption amount of the ink per unit mass of the recording medium is equal to or less than 1.0, and a wetting index of the recording medium measured based on JIS K6768 is equal to or more than 46, and when the wetting index is set as x, and the absorption amount of the ink per unit mass of the recording medium is set as y, a relationship of $y \geq 0.002x - 0.027$ is satisfied.

That is, according to the aspect of the invention, it is possible to provide a recording method capable of rapid printing using the resin-containing ink and recording a high-quality image with an excellent chromogenic property.

In addition, it is preferable that, when the wetting index measured based on JIS K6768 is set as x, and the absorption amount of the ink per unit mass of the recording medium is set as y, the recording medium satisfy a relationship of $y \geq 5 \times 10^{17} \times x^{-10.796}$. By satisfying such a relationship, even in a case where mass for one droplet of the ink to be discharged is large and the image quality degradation (aggregation or overflow) easily occurs, it is possible to further reliably suppress image quality degradation (aggregation or overflow) in the rapid recording and to further improve a chromogenic property of an image.

In addition, it is preferable that, when the wetting index of the recording medium measured based on JIS K6768 is set as x, and the absorption amount of the ink per unit mass of the recording medium is set as y, the recording medium satisfy a relationship of $y \leq -0.00552x + 3.2429$. By satisfying such a relationship, even in a case where mass for one droplet of the ink to be discharged is small and regions with no ink are further easily formed between dots of landed ink, it is possible to improve a chromogenic property of an image and to further increase a recording speed.

As long as the absorption amount of the resin-containing ink per unit mass and the wetting index are in the range, as such a recording medium, any recording media can be used, however, it is preferable to use a recording medium including an ink accommodation layer on a surface of a base material (for example, paper, fiber, leather, plastic, glass, ceramics, metal, or the like). Accordingly, it is possible to further increase a chromogenic property of an image.

It is preferable that the ink accommodation layer include at least one kind of a material selected from a group consisting of urethane, acryl, and polyester, and/or at least two kinds of copolymer selected from a group consisting of urethane, acryl, and polyester. By including the material described above, it is possible to further easily control the absorption of the resin-containing ink per unit mass and the wetting resin.

As urethane, it is possible to use "PATELACOL RSI-001" (product name, manufactured by DIC), for example.

As acryl, it is possible to use "ES-960MC" (product name, manufactured by Takamatsu Oil & Fat Co., Ltd.), for example.

As polyester, it is possible to use "Elitel KT 8701" (product name, manufactured by UNITIKA LTD.), for example.

In addition, as a copolymer, it is possible to use "Rikabond SU200" (product name, manufactured by CSC co., ltd.), for example.

The ink accommodation layer can be formed by applying and drying a coating liquid obtained by dissolving the materials configuring the ink accommodation layer in a solvent, on a surface of the base material described above.

In addition, a cross-linking agent or surfactant may be added to the coating liquid. Accordingly, it is possible to further easily control the absorption amount of the resin-containing ink per unit mass and the wetting index.

In the invention, the recording medium is a recording medium to which the resin-containing ink is applied, in a heated state. Accordingly, it is possible to dry the resin-containing ink discharged onto the surface of the recording medium in short time. In addition, it is possible to easily form a film of the resin included in the resin-containing ink on the recording medium.

A surface temperature of the recording medium in a heated state is preferable to be equal to or higher than 40° C. and equal to or lower than 60° C. Accordingly, it is possible to further efficiently dry the resin-containing ink discharged onto the surface of the recording medium. In addition, it is possible to further easily form a film of the resin contained in the resin-containing ink on the recording medium.

In addition, the discharging amount of the resin-containing ink with respect to the recording medium is preferable to be equal to or more than 14 ng and equal to or less than 23 ng, and the resolution of the image recorded on the recording medium is preferable to be equal to or more than 720×720 dpi. Accordingly, it is possible to improve a chromogenic property and to form an image with high resolution.

Resin-Containing Ink

Next, the resin-containing ink applied to the invention will be described.

As described above, the resin-containing ink includes the resin and the solvent.

Hereinafter, each component will be described.

Resin

The resin is not particularly limited as long as the resin can be dispersed in the resin-containing ink and a film can be formed on the recording medium, however, it is preferable to use thermoplastic resin. Accordingly, when the resin-containing ink is discharged onto the heated recording medium, by softening the thermoplastic resin, it is possible to make forming of the resin of the thermoplastic resin on the recording medium easier. As a result, it is possible to further improve a chromogenic property of an image.

As the thermoplastic resin, a homopolymer or a copolymer of urethane resin, acrylic acid, acrylic ester, methacrylic acid, methacrylic ester, acrylonitrile, cyanoacrylate, acrylamide, olefin, styrene, vinyl acetate, vinyl chloride, vinyl alcohol, vinyl ether, vinyl pyrrolidone, vinyl pyridine, vinyl carbazole, vinyl imidazole, or vinylidene chloride, fluorine resin, natural resin, or the like is used, for example. In addition, the copolymer can be in any forms of a random copolymer, a block copolymer, an alternate copolymer, and a graft copolymer.

The content of the thermoplastic resin particles is preferable to be equal to or more than 1% by mass and equal to or less than 8% by mass, with respect to the total mass of the ink composition as solid content.

Solvent

The solvent is not particularly limited, as long as the resin described above is dissolved, it is preferable to use at least one selected from a group consisting of 2-pyrrolidone, 1,2-hexanediol, dipropylene glycol, and propylene glycol. By including the solvent described above, it is possible to further efficiently soften the resin on the recording medium, and to further easily form a film. As a result, it is possible to further improve a chromogenic property of an image.

Coloring Agent

The resin-containing ink may contain a coloring agent.

As the coloring agent, it is preferable to use an insoluble dye or pigment, and it is more preferable to use the pigment. The pigment not only has a property insoluble or difficult to be solved in water, but also has a property which makes it difficult to perform color fading in regards to color or glass. Thus, a recorded material printed by the ink using the pigment is excellent in gas resistance, light resistance, and preservative property. As the pigment, it is possible to use an organic pigment or an inorganic pigment used from the related art in an ink composition for ink jet printing.

The inorganic pigment is not particularly limited, however, for example, it is possible to use titanium oxide and iron oxide, or carbon black which is manufactured by a well-known method such as a contact method, a furnace method, or a thermal method.

The organic pigment is not particularly limited, however, for example, an azo pigment (for example, azo lake, an insoluble azo pigment, a condensed azo pigment, or a chelate azo pigment), a Polycyclic pigment (for example, a phthalocyanine pigment, a perylene pigment, a perinone pigment, an anthraquinone pigment, a quinacridone pigment, a dioxazine pigment, a thioindigo pigments, an isoindolinone pigment, or a quinophthalone pigment), dye chelate (for example, basic dye chelate or acid dye chelate), a nitro pigment, a nitroso pigment, or aniline black can be used. Among the pigments, it is preferable to use a pigment having excellent affinity with water.

The pigment for black ink is not particularly limited, however, for example, it is possible to use the organic pigment such as carbon black (C.I. Pigment Black 7) such as furnace black, lamp black, acetylene black, or channel black, cuprate and ferrioxide (C.I. Pigment Black 11), or aniline black (C.I. Pigment Black 1) such as titanium oxide.

As detailed examples of the preferable carbon black, Nos. 2300 and 900, MCF88, No. 20B, No. 33, No. 40, No. 45, No. 52, MA7, MA8, MA100, No. 2200B, and the like are used as carbon black manufactured by Mitsubishi Chemical Corporation. Color Black FW1, FW2, FW2V, FW18, FW200, S150, S160, S170, PRINTEX 35, U, V, 140U, Special Black 6, 5, 4A, 4, 250, and the like are used, as carbon black manufactured by Evonik Degussa Industries. Conductex SC, Raven 1255, 5750, 5250, 5000, 3500, 1255, 700, and the like are used, as carbon black manufactured by Columbian Chemicals Company. REGAL 400R, 330R, 660R, MOGUL L, MONARCH 700, 800, 880, 900, 1000, 1100, 1300, 400, ELFTEX 12 and the like manufactured by Cabot Corporation are used, as carbon black manufactured by Cabot Corporation.

The pigment for color ink is not particularly limited, however, for example, C.I. Pigment Yellow 1 (Fast Yellow G), 3, 12 (Disazo Yellow AAA), 13, 14, 17, 23, 24, 34, 35, 37, 42 (yellow iron oxide), 53, 55, 74, 81, 83 (Disazo Yellow HR), 95, 97, 98, 100, 101, 104, 108, 109, 110, 117, 120, 138, 150, 151, 154, 155, 180, 185, 213; C.I. Pigment Red 1, 2, 3, 5, 17, 22 (Brilliant First Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 92, 101 (Iron Red), 104, 105, 106, 108 (Cadmium Red), 112, 114, 122 (Quinacridone Magenta), 123, 146, 149, 166, 168, 170, 172, Pigment Violet 1 (Rhodamine Lake), 3, 5:1, 16, 19 (Quinacridone Red), 23, 38; or C.I. Pigment Blue 1, 2, 15 (Phthalocyanine Blue R), 15:1, 15:2, 15:3 (Phthalocyanine Blue G), 15:4, 15:6 (Phthalocyanine Blue E), 16, 17:1, 56, 60, 63; or the like can be used.

The particle size of the pigment is not particularly limited, however, the average particle size thereof is preferable to be equal to or less than 25 μm, and more preferable to be equal to or less than 2 μm. Accordingly, it is possible to suppress generation of clogging and to obtain excellent discharging stability.

The content of the pigment with respect to the resin-containing ink is preferable to be equal to or more than 0.5% by mass and equal to or less than 15.0% by mass, and more preferable to be equal to or more than 1.0% by mass and equal to or less than 10.0% by mass.

The soluble resin which can be used in dispersion of the pigment is not particularly limited, however, for example, polyvinyl alcohols, polyvinyl pyrrolidones, polyacrylic acid, an acrylic acid-acrylonitrile copolymer, a vinyl acetate-acrylic ester copolymer, an acrylic acid-acrylic ester copolymer, a styrene-acrylic acid copolymer, a styrene-methacrylic acid copolymer, a styrene-methacrylic acid-acrylic ester copolymer, a styrene-α-methylstyrene-acrylic acid copolymer, a styrene-α-methylstyrene-acrylic acid-acrylic ester copolymer, a styrene-maleic acid copolymer, a styrene-maleic anhydride copolymer, a vinylnaphthalene-acrylic acid copolymer, a vinylnaphthalene-maleic acid copolymer, a vinyl acetate-maleic ester copolymer, a vinyl acetate-crotonic acid copolymer, a vinyl acetate-acrylic acid copolymer, and salts thereof are used. Among them, a copolymer of a monomer having a hydrophobic functional group and a monomer having a hydrophilic functional group, and a polymer formed of a monomer having both of the hydrophobic functional group and the hydrophilic functional group are particularly preferable. As the form of the copolymer, any forms of a random copolymer, a block copolymer, an alternate copolymer, and a graft copolymer can be used.

The salts thereof are not particularly limited, however, for example, slats with basic compounds such as ammonia, ethylamine, diethylamine, triethylamine, propylamine, isopropylamine, dipropylamine, butylamine, isobutylamine, diethanolamine, triethanolamine, tri-iso-propanolamine, amino methyl propanol, and morpholine are used. The additive amount of the basic compounds described above is not particularly limited as long as it is equal to or more than neutralization equivalent of the soluble resin.

As the soluble resin which can be used in dispersion of the pigments described above, it is possible to use commercially available product.

In detail, Joncryl 67 (weight-average molecular weight: 12,500, acid value: 213), Joncryl 678 (weight-average molecular weight: 8,500, acid value: 215), Joncryl 586 (weight-average molecular weight: 4,600, acid value: 108), Joncryl 611 (weight-average molecular weight: 8,100, acid value: 53), Joncryl 680 (weight-average molecular weight: 4,900, acid value: 215), Joncryl 682 (weight-average molecular weight: 1,700, acid value: 238), Joncryl 683 (weight-average molecular weight: 8,000, acid value: 160), Joncryl 690 (weight-average molecular weight: 16,500, acid value: 240) (product names: all manufactured by BASF Japan) and the like are used.

The surfactant which can be used for dispersing the pigment is not particularly limited, however, for example, the anion surfactant such as alkane sulfonate, α-olefin sulfonate, alkylbenzene sulfonate, alkyl naphthalene sulfonate, acylmethyltaurine salts, dialkylsulfo silicate salts, alkyl sulfate ester salts, sulfated olefins, polyoxyethylene alkyl ether sulfate ester salts, alkyl phosphate ester salts, polyoxyethylene alkyl ether phosphoric acid ester salts, or monoglyceride phosphate ester salts, the ampholytic surfactant such as alkyl pyridinium salt, alkylamino acid salts, or alkyl dimethyl betaine, and the nonionic surfactant such as polyoxyethylene alkyl ethers, polyoxyethylene alkyl phenyl ethers, polyoxyethylene alkyl esters, polyoxyethylene alkyl amides, glycerin alkyl esters, or sorbitan alkyl esters, are used.

The additive amount of the soluble resin or the surfactant which can be used in dispersion of the pigment, with respect to the pigment, is preferable to be equal to or more than 1.0% by mass and equal to or less than 100% by mass, and more preferable to be equal to or more than 5.0% by mass and equal to or less than 50.0% by mass, with respect to 1.0% by mass of the pigment. By setting the additive amount thereof in the range described above, it is possible to secure dispersion stability of the pigment into water. It is also possible to use the pigment which is made to be easily dispersed and dissolved by chemically and physically introducing hydrophilic functional group to the surface of the pigment.

Surfactant

The resin-containing ink may include the surfactant.

As the surfactant, a silicon-based surfactant is preferably used. As the silicon-based surfactant, a polysiloxane-based compound or the like is preferably used, and for example, polyether-modified organosiloxane is used. In addition, it is possible to use commercially available products, and for example, BYK-306, BYK-307, BYK-333, BYK-341, BYK-345, BYK-346, and BYK-348 (product names: all manufactured by BYK Japan KK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (product names: all manufactured by Shin-Etsu Chemical Co., Ltd.) are used.

Water

The resin-containing ink may include water.

Water obtained by extremely removing ionic impurities, like pure water or ultrapure water such as ion-exchange water, ultrafilterated water, reverse osmotic water, or distilled water. In addition, if water which is sterilized by ultraviolet irradiation or hydrogen peroxide addition is used, since it is possible to prevent generation of mold or bacteria in a case of storing pigment dispersion liquid and an ink composition using this for a long time, the water described above is suitable to be used.

Other Components

The resin-containing ink can further include a pH adjusting agent, am antiseptic agent, fungicide, a rust inhibitor, a chelator, or the like, in addition to the components described above.

The pH adjusting agent is not particularly limited, however, for example, potassium dihydrogen phosphate disodium hydrogen phosphate, sodium hydroxide, lithium hydroxide, potassium hydroxide, ammonia, diethanolamine, triethanolamine, triisopropanolamine, potassium carbonate, sodium carbonate, sodium hydrogen carbonate or the like is used.

The antiseptic agent and fungicide are not particularly limited, however, for example, sodium benzoate, pentachlorophenol sodium, 2-pyridinethiol-1-oxide sodium, sodium sorbate, sodium dehydroacetate, 1,2-dibenzisothiazolin-3-one or the like is used. In the commercial products, Proxel XL2 and Proxel GXL (product names: all manufactured by NITTO DENKO Avecia Inc.), Denicide CSA and NS-500W (product names: all manufactured by Nagase ChemteX Corporation), and the like are used.

The rust inhibitor is not particularly limited, however, benzotriazole or the like is used.

The chelator is not particularly limited, however, for example, ethylenediaminetetraacetate and salts thereof (ethylenediaminetetraacetic acid disodium dihydrogen salt or the like) are used.

Ink Jet Recording Apparatus

Next, an example of the ink jet recording apparatus will be described.

Figure is a partial cross-sectional view schematically showing a part of an ink jet recording apparatus.

An ink jet recording apparatus 9 includes transporting mechanisms 2, 3, 4, and 5, a carriage 6, an ink jet head 7, and a heater 8.

The transporting mechanisms 2, 3, 4, and 5 are rollers which transports a recording medium 10 to a location opposing to a nozzle surface 7b of the ink jet head 7.

The carriage 6 causes the ink jet head 7 to scan in a direction substantially intersecting with a transporting direction of the recording medium 10.

The ink jet head 7 includes the nozzle surface 7b on which a plurality of nozzles which are ink discharging ports are formed, and discharges ink droplets towards the recording medium 10 from the nozzles to form an image on the recording medium 10.

The heater 8 warms the recording medium 10 from a side opposite to a printing surface. In addition, the heater 8 may be a heater which warms the recording medium 10 from a side of the printing surface.

Next, operations when recording an image onto the recording medium 10 in the ink jet recording apparatus 9 will be described.

First, the recording medium 10 fed to the ink jet recording apparatus 9 is taken by the transporting mechanisms 2 and 3, and is transported to a location opposite to the nozzle surface 7b of the ink jet head 7 by the transporting mechanisms 4 and 5.

After the transportation, ink droplets are discharged to the recording medium 10 heated from the ink jet head 7 to record an image. At that time, the recording medium 10 immediately before forming an image is preliminarily heated by the heater 8.

After that, the recording medium 10 onto which the image is recorded by the ink jet head 7, is further warmed by the heater 8, dried, and discharged from the recording apparatus 9. In addition, the heater 8 may be separately provided on upstream and downstream with respect to the ink jet head 7, in the transporting direction of the recording medium 10, or may be provided only on an upstream side thereof.

In addition, the ink jet recording apparatus 9 includes a temperature sensor. Accordingly, a temperature of the surface of the recording medium 10 can be measured. In detail, it is possible to use a non-contact type infrared radiation thermometer which measures by receiving, from a surface of an object, radiation of infrared energy proportional to the temperature thereof.

Hereinafter, the preferable embodiment of the invention has been described, however, the invention is not limited thereto.

EXAMPLES

1. Preparation of Resin-Containing Ink

Resin-Containing Ink 1

First, as a resin dispersion, ion-exchange water was added to 5.0% by mass of thermoplastic saturated copolymerized polyester resin (glass transition temperature Tg1: 80° C., Elitel KA 3556 (product name, manufactured by UNITIKA LTD.)), and 20.0% by mass of a pigment (C.I. Pigment Blue 15:3) and stirred by setting the entire solution as 100% by mass to obtain a mixture.

The mixture was subjected to a dispersion process for 6 hours with zirconia beads (diameter of 1.5 mm), using a sand mill (manufactured by YASUKAWA SEISAKUSHO CO., LTD.). After that, by separating zirconia beads by a separator, pigment dispersion liquid was obtained.

As solvents, 3.0% by mass of 1,2-hexanediol, 7.0% by mass obtained by combining dipropylene glycol, propylene glycol, 2-pyrrolidone, 0.5% by mass of polyether modified-siloxane as the silicon-based surfactant, the ion-exchange water as residue were added to 7.0% by mass of the pigment dispersion liquid described above, and mixed so as to be 100% by mass. After that, the mixture was stirred at a normal temperature for 1 hour, and then filtered by a membrane filter with a hole diameter of 5 μm, to obtain resin-containing ink 1.

Resin-Containing Ink 2

First, as a resin dispersion, ion-exchange water was added to 5.0% by mass of thermoplastic saturated copolymerized polyester resin (glass transition temperature Tg1: 80° C., Elitel KA 3556 (product name, manufactured by UNITIKA LTD.)), and 20.0% by mass of a pigment (C.I. Pigment Red 122) and stirred by setting the entire solution as 100% by mass to obtain a mixture.

The mixture was subjected to a dispersion process for 6 hours with zirconia beads (diameter of 1.5 mm), using a sand mill (manufactured by YASUKAWA SEISAKUSHO CO., LTD.). After that, by separating zirconia beads by a separator, pigment dispersion liquid was obtained.

As solvents, 3.0% by mass of 1,2-hexanediol, 7.0% by mass obtained by combining dipropylene glycol, propylene glycol, 2-pyrrolidone, 0.5% by mass of polyether modified-siloxane as the silicon-based surfactant, the ion-exchange water as residue were added to 7.0% by mass of the pigment dispersion liquid described above, and mixed so as to be 100% by mass. After that, the mixture was stirred at a normal temperature for 1 hour, and then filtered by a membrane filter with a hole diameter of 5 μm, to obtain resin-containing ink 2.

2. Manufacture of Recording Medium and Recording of Image

The recording medium was manufactured as described below. In addition, an image was recorded on the recording medium as described below.

Examples 1 to 14 and Comparative Examples 1 to 4

A recording medium including each ink accommodation layer was manufactured by applying coating liquid shown in Table 1 onto a PET film (product name: "G-1" manufactured by Teijin Limited) as a base and drying at 100° C. for 2 minutes. A thickness of the coated layer on the recording medium was 20 μm. In addition, as a cross-linking agent, a cross-linking agent for water born resin (product name: "V-02" manufactured by Nisshinbo Chemical Inc.) was used.

Meanwhile, as the ink jet recording apparatus, an apparatus obtained by installing a heater capable of changing a temperature in a paper guide unit so as to be able to heat and prepare a recording medium at the time of recording an image, by remodeling a part of an ink jet printer PX-G5000 (manufactured by Seiko Epson Corp.) was used.

The ink cartridge of the remodeled ink jet printer described above was filled with the resin-containing ink 1 and 2.

Next, the recording medium of each Example and Comparative Example shown in Table 1 was heated so that a surface temperature Tm of the recording medium is 45° C. by the heater installed in the feed guide unit, a solid patterned image of the secondary color (resin-containing ink 1+resin-containing ink 2) and a solid patterned image of the primary color (resin-containing ink 1) were recorded.

In addition, in the solid patterned image of secondary color, solid pattern was formed with pass numbers of 4, resolution of vertical of 720 dpi and horizontal of 720 dpi, and for 10% Duty from Duty 0% to 200%.

In addition, in the solid patterned image of the primary color, solid pattern was formed with pass numbers of 4, resolution of vertical of 720 dpi and horizontal of 720 dpi, and for 10% Duty from Duty 0% to 100%.

In addition, two solid patterns in a case of adjusting weight of ink droplet to be 14.5 ng by assuming a case of small weight per ink droplet, and in a case of adjusting weight of ink droplet to be 22.5 ng by assuming a case of great weight per ink droplet, were recorded.

In addition, a printing speed was adjusted in a printing mode so as to have 27 m²/h in a printer having a width of 64 inches.

Definition of Duty

Herein, "Duty" means that, in a case of resolution with vertical of 1440 dpi and horizontal of 720 dpi, on what percent of pieces had the ink disposed, among 1036800 pieces obtained by dividing 1 square inch into 1440 pieces of vertical and 720 pieces of horizontal.

In Table 1, coating liquid including acrylic resin (product name: "ES-960MC" manufactured by Takamatsu Oil & Fat Co., Ltd.) was shown as 960, coating liquid including urethane-based resin (product name: "PATELACOL RSI-001" manufactured by DIC) was shown as RSI001, coating liquid including an acryl-urethane copolymer (product name: "Rikabond SU200" manufactured by CSC co., ltd.) was shown as SU200, mixed liquid of the coating liquid including urethane-based resin (product name: "PATELACOL RSI-001" manufactured by DIC) and coating liquid including polyester-based resin (product name: "Elitel KT 8701" manufactured by UNITIKA LTD.) with a solid ratio of 1:1 was shown as KT50, and the surfactant (product name: "SAG002" manufactured by Nissin Chemical Co., Ltd.) was shown as SAG002.

In addition, the wetting index was measured by a method based on JIS K6768, using a wet pen (manufactured by Veta-Phone).

In addition, the absorption amount of the ink per unit mass was measured as described below.

Test pieces with 4 cm in four directions were cut from the recording medium of each Example and Comparative Example.

The test pieces were left in an environment at 50° C. for 10 minutes, in a state of being immersed in the resin-containing ink 1 which will be described later. The test pieces after being left were washed for 5 seconds in pure water, dried at 50° C. for 30 minutes, and then, test pieces after immersion was obtained.

Absorption amount of ink per unit mass=((mass of test piece after immersion)−(mass of test piece before immersion))/mass of accommodation layer before immersion

TABLE 1

| | Coating liquid | | | |
|---|---|---|---|---|
| | Type (mixing ratio) | Addition of cross-linking agent (solid ratio) [% by mass] | Wetting index x | absorption amount of ink per unit |
| Example 1 | 960:KT50 (5:5) | 2.50% | 52 | 0.167 |
| Example 2 | 960 | 10.00% | 56 | 0.179 |
| Example 3 | 960:KT50 (4.5:5.5) | 2.30% | 52 | 0.128 |
| Example 4 | SU-200:KT50 (5:5) + SAG002 (0.1% by mass) | 2.50% | 50 | 0.178 |
| Example 5 | 960:KT50 (6:4) | 2.00% | 54 | 0.23 |
| Example 6 | SU-200 | 0.00% | 46 | 0.755 |
| Example 7 | 960:RSI001 (5:5) | 10.00% | 56 | 0.085 |
| Example 8 | 960 | 0.00% | 56 | 0.251 |
| Example 9 | 960:SU-200 (5:5) | 0.00% | 54 | 0.688 |
| Example 10 | 960 | 1.00% | 56 | 0.215 |
| Example 11 | 960 | 5.00% | 56 | 0.241 |
| Example 12 | SU-200:KT50 (5:5) | 2.50% | 46 | 0.178 |
| Example 13 | SU-200:KT50 (3:7) | 3.50% | 46 | 0.065 |
| Example 14 | 960:KT50 (4:6) | 3.00% | 50 | 0.077 |
| Comparative Example 1 | 960:KT50 (4:6) | 10.00% | 56 | 0.064 |
| Comparative Example 2 | RSI001 | 10.00% | 54 | 0.066 |
| Comparative Example 3 | SU-200:KT50 (1:9) | 4.50% | 46 | 0.046 |
| Comparative Example 4 | 960:KT50 (3:7) | 3.50% | 68 | 0.068 |

3. Evaluation of Image

From the solid patterned images obtained as described above, in the secondary color with large amount of ink, optical density (OD value) of a portion with the largest amount of ink was acquired in a range of the amount of ink with no generation of image quality degradation (aggregation or overflow), and in the primary color with small amount of ink and with which regions with no ink are easily formed between dots of the landed ink, optical density (OD value) of a portion with largest amount of ink (Duty: 100% by parts) was acquired by measurement using SpectroScan (maunufactured by Gretag Macbeth), and they were evaluated according to the following criteria.

Secondary Color
A: The OD value is greater than 1.7.
B: The OD value is equal to or more than 1.65 and equal to or less than 1.7.
C: The OD value is smaller than 1.65.
Primary Color
α: The OD value is greater than 1.95.
β: The OD value is equal to or more than 1.9 and equal to or less than 1.95.
γ: The OD value is smaller than 1.9.
Overall Determination When the weight of ink for one droplet of the ink in secondary color was 14.5 ng and 22.5 ng, a total point of determination evaluated by determination criteria described above when weight of ink for one droplet of the ink in the primary color is 14.5 ng was calculated according to criteria described below, and the overall determination was performed.
A or α: 2
B or β: 1
C or γ: 0
The results were shown in Table 2.

TABLE 2

| | Determination as ink amount for one droplet | | | |
|---|---|---|---|---|
| | 14.5 ng (secondary color) | 22.5 ng (secondary color) | 14.5 ng (primary color) | Overall evaluation |
| Example 1 | A | A | α | 6 |
| Example 2 | A | A | β | 5 |
| Example 3 | A | B | α | 5 |
| Example 4 | A | B | α | 5 |
| Example 5 | A | A | β | 5 |
| Example 6 | A | B | β | 4 |
| Example 7 | B | B | α | 4 |
| Example 8 | A | A | γ | 4 |
| Example 9 | A | A | γ | 4 |
| Example 10 | A | A | γ | 4 |
| Example 11 | A | A | γ | 4 |
| Example 12 | A | C | α | 4 |
| Example 13 | B | C | α | 3 |
| Example 14 | B | C | α | 3 |
| Comparative Example 1 | C | C | α | 2 |
| Comparative Example 2 | C | C | γ | 0 |
| Comparative Example 3 | C | C | γ | 0 |
| Comparative Example 4 | C | C | α | 2 |

As being clear in Table 2, the recording method of the invention was a method capable of obtaining a high-quality image having an excellent chromogenic property, even with a high recording speed. Meanwhile, in Comparative Examples, sufficiently satisfied results were not obtained.

The entire disclosure of Japanese Patent Application No. 2013-000708, filed Jan. 7, 2013 is expressly incorporated by reference herein.

What is claimed is:

1. A recording method of discharging ink including resin and a solvent onto a heated recording medium to record an image on the recording medium by an ink jet recording apparatus,
   wherein an absorption amount of the ink per unit mass of the recording medium is equal to or less than 1.0, and a wetting index of the recording medium measured based on JIS K6768 is equal to or more than 46,
   when the wetting index is set as x, and the absorption amount of the ink per unit mass of the recording medium is set as y, a relationship of y≥0.002x−0.027 is satisfied,
   the recording medium includes an ink accommodation layer, and
   the ink accommodation layer includes at least two kinds of copolymer selected from a group consisting of urethane, acryl, and polyester.

2. The recording method according to claim 1,
   wherein, when the wetting index of the recording medium measured based on JIS K6768 is set as x, and the absorption amount of the ink per unit mass of the recording medium is set as y, a relationship of $y \geq 5 \times 10^{17} \times x^{-10.796}$ is satisfied.

3. The recording method according to claim 1, wherein, when the wetting index of the recording medium measured based on JIS K6768 is set as x, and the absorption amount of the ink per unit mass of the recording medium is set as y, a relationship of $y \leq 0.00552x + 3.2429$ is satisfied.

4. The recording method according to claim 1, wherein the resin included in the ink is thermoplastic resin.

5. The recording method according to claim 1, wherein the solvent included in the ink is at least one selected from a group consisting of 2-pyrrolidone, 1,2-hexanediol, dipropylene glycol, and propylene glycol.

6. The recording method according to claim 1, wherein a discharging amount of the ink with respect to the recording medium is equal to or more than 14 ng and equal to or less than 23 ng, and resolution of the image recorded on the recording medium is equal to or more than 720×720 dpi.

7. The recording method according to claim 1, wherein a surface temperature of the recording medium in a heated state is equal to or more than 40° C. and equal to or less than 60° C.

* * * * *